US007440873B2

(12) United States Patent
Bailey

(10) Patent No.: US 7,440,873 B2
(45) Date of Patent: Oct. 21, 2008

(54) APPARATUS AND METHOD OF PROCESSING DATA TO IMPROVE THE PERFORMANCE OF A FLOW MONITORING SYSTEM

(75) Inventor: Timothy J. Bailey, Longmeadow, MA (US)

(73) Assignee: Expro Meters, Inc., Wallingford, CT (US)

( * ) Notice: Subject to any disclaimer, the term of this patent is extended or adjusted under 35 U.S.C. 154(b) by 0 days.

(21) Appl. No.: 11/378,000

(22) Filed: Mar. 17, 2006

(65) Prior Publication Data

US 2006/0212231 A1    Sep. 21, 2006

Related U.S. Application Data

(60) Provisional application No. 60/663,140, filed on Mar. 17, 2005.

(51) Int. Cl.
G01F 1/00 (2006.01)
G06F 17/00 (2006.01)

(52) U.S. Cl. .................. 702/191; 702/45; 73/861.356

(58) Field of Classification Search ............. 702/191, 702/45
See application file for complete search history.

(56) References Cited

U.S. PATENT DOCUMENTS

| | | | |
|---|---|---|---|
| 4,048,853 A | 9/1977 | Smith et al. ............... 73/861.25 |
| 4,080,837 A | 3/1978 | Alexander et al. .......... 73/61.45 |
| 4,248,085 A | 2/1981 | Coulthard ................. 73/861.06 |
| 4,445,389 A | 5/1984 | Potzick et al. ............. 73/861.27 |
| 4,638,207 A | 1/1987 | Radice et al. | |
| 4,677,305 A | 6/1987 | Ellinger ..................... 73/290 V |
| 4,794,295 A | 12/1988 | Penneck et al. | |
| 4,896,540 A | 1/1990 | Shakkottai et al. ......... 73/861.02 |
| 5,040,415 A | 8/1991 | Barkhoudarian .......... 73/861.03 |
| 5,083,452 A | 1/1992 | Hope ........................... 73/61 R |
| 5,218,197 A | 6/1993 | Carroll ................... 250/227.19 |
| 5,285,675 A | 2/1994 | Colgate et al. ............... 73/23.2 |
| 5,363,342 A | 11/1994 | Layton et al. ............... 367/149 |
| 5,367,911 A | 11/1994 | Jewell et al. ............. 73/861.08 |

(Continued)

FOREIGN PATENT DOCUMENTS

WO   WO 93/14382   7/1993

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—Hal D Wachsman

(57) ABSTRACT

An apparatus and method of processing flow meter data to filter out signal noise is provided. The method includes defining the flow meter data as a k-ω plane, wherein the k-ω plane includes a first k-plane quadrant separated from a second k-plane quadrant by a predetermined axis. The flow meter data includes a first data set disposed within the first k-plane quadrant and a second data set disposed within the second k-plane quadrant. The first data set and the second data set are disposed symmetrically about the predetermined axis and subtracting the first data set from the second data set to obtain a resultant data set.

20 Claims, 16 Drawing Sheets

U.S. PATENT DOCUMENTS

| | | | |
|---|---|---|---|
| 5,398,542 A | 3/1995 | Vasbinder | 73/40.5 |
| 5,524,475 A | 6/1996 | Kolpak et al. | 73/19.03 |
| 5,526,844 A | 6/1996 | Kamen et al. | 137/614.11 |
| 5,591,922 A | 1/1997 | Segeral et al. | 73/861.04 |
| 5,741,980 A | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,948,959 A | 9/1999 | Peloquin | 73/1.83 |
| 6,151,958 A | 11/2000 | Letton et al. | 73/61.79 |
| 6,202,494 B1 | 3/2001 | Riebel et al. | 73/861.29 |
| 6,354,147 B1 | 3/2002 | Gysling et al. | 73/61.79 |
| 6,378,357 B1 | 4/2002 | Han et al. | 73/54.41 |
| 6,435,030 B1 | 8/2002 | Gysling et al. | 73/587 |
| 6,463,813 B1 | 10/2002 | Gysling | 73/862.59 |
| 6,536,291 B1 | 3/2003 | Gysling et al. | 73/861.42 |
| 6,550,342 B2 | 4/2003 | Croteau et al. | 73/800 |
| 6,587,798 B2 * | 7/2003 | Kersey et al. | 702/50 |
| 6,601,458 B1 | 8/2003 | Gysling et al. | 73/861.04 |
| 6,609,069 B2 * | 8/2003 | Gysling | 702/48 |
| 6,691,584 B2 | 2/2004 | Gysling et al. | 73/861.42 |
| 6,732,575 B2 | 5/2004 | Gysling et al. | 73/61.79 |
| 6,782,150 B2 | 8/2004 | Davis et al. | 385/12 |
| 6,813,962 B2 | 11/2004 | Gysling et al. | 73/861.26 |
| 6,837,098 B2 | 1/2005 | Gysling et al. | 73/61.79 |
| 7,110,893 B2 * | 9/2006 | Loose et al. | 702/48 |
| 7,127,360 B2 * | 10/2006 | Gysling et al. | 702/45 |
| 7,146,864 B2 * | 12/2006 | Sullivan et al. | 73/861.42 |
| 2002/0123852 A1 | 9/2002 | Gysling et al. | |
| 2002/0129662 A1 | 9/2002 | Gysling et al. | |
| 2003/0136186 A1 | 7/2003 | Gysling et al. | |
| 2003/0154036 A1 | 8/2003 | Gysling et al. | |
| 2004/0016284 A1 | 1/2004 | Gysling et al. | |
| 2005/0159904 A1 * | 7/2005 | Loose et al. | 702/45 |

FOREIGN PATENT DOCUMENTS

| | | |
|---|---|---|
| WO | WO 99/67629 | 12/1999 |
| WO | WO 0000793 | 1/2000 |

OTHER PUBLICATIONS

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag, pp. 27-35.

"Viscous Attentuation of Acoustic Waves in Suspensions" by R.L. Gibson, Jr. and M.N. Toksoz, pp. 1925-1934, May 1989.

* cited by examiner

APPARATUS AND METHOD OF PROCESSING DATA TO IMPROVE THE PERFORMANCE OF A FLOW MONITORING SYSTEM

CROSS-REFERENCE TO RELATED PATENT APPLICATIONS

The present application claims the benefit of U.S. Provisional Patent Application No. 60/663,140 filed Mar. 17, 2005, which is incorporated herein by reference in its entirety.

TECHNICAL FIELD

This invention relates generally to a method and apparatus for measuring at least one parameter of a fluid flowing within a pipe. More specifically, this invention relates to a method and apparatus for processing data to improve the performance of a flow monitoring system having an array of sensors for measuring the flow of a fluid through a pipe.

BACKGROUND

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or gas/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of fluids in an industrial flow process. Such physical parameters may include, for example, volumetric flow rate, composition, gas volume fraction, consistency, density, and mass flow rate.

One such sensing technology is described in U.S. Pat. No. 6,609,069 to Gysling, entitled "Method and Apparatus for Determining the Flow Velocity Within a Pipe", which is incorporated herein by reference. The '069 patent describes a method and corresponding apparatus for measuring the flow velocity of a fluid in an elongated body (pipe) by sensing vortical disturbances convecting with the fluid. The method includes the steps of providing an array of at least two sensors disposed at predetermined locations along the elongated body, each sensor for sampling the pressure of the fluid at the position of the sensor at a predetermined sampling rate; accumulating the sampled data from each sensor at each of a number of instants of time spanning a predetermined sampling duration; and constructing from the accumulated sampled data at least a portion of a so called k-ω plot, where the k-ω plot is indicative of a dispersion relation for the propagation of acoustic pressures emanating from the vortical disturbances. The method also includes the steps of identifying a convective ridge in the k-ω plot; determining the orientation of the convective ridge in the k-ω plot; and determining the flow velocity based on a predetermined correlation of the flow velocity with the slope of the convective ridge of the k-ω plot.

Such sensing technology is effective in determining various parameters of a fluid flow within a pipe. However, as with any computationally complex process, there remains a desire to increase computational efficiency, accuracy, and robustness.

Unfortunately however, in some situations flow measurements may be corrupted or they may not be able to be obtained at all due to the presence of unwanted signals masking the convective ridge (or vortical flow ridge). This unwanted energy can obscure or mask the energy of the convective ridge, and therefore, make it difficult or even impossible to isolate the energy of the convective ridge to determine the slope of the ridge. In a similar fashion to the flow measurements regarding the convective ridges, the measurements regarding the acoustic ridges also typically include unwanted signals that may mask or prevent the measurement altogether of the acoustic ridge. This is undesirable because the slope of the convective ridge is indicative of velocity of the fluid flow within the pipe and the slope of the acoustic is indicative of the speed of sound of the fluid.

SUMMARY OF THE INVENTION

A method of processing flow meter data to filter out signal noise is provided, wherein the method includes defining the flow meter data in a k-ω plane, wherein the k-ω plane includes a first k-plane quadrant separated from a second k-plane quadrant by a predetermined axis, wherein the flow meter data includes a first data set disposed within the first k-plane quadrant and a second data set disposed within the second k-plane quadrant and wherein the first data set and the second data set are disposed symmetrically about the predetermined axis and subtracting the first data set from the second data set to obtain a resultant data set.

An apparatus for measuring a parameter of a fluid flowing within a pipe is provided, wherein the apparatus includes logic for implementing a method of processing flow meter data to filter out signal noise, wherein the apparatus includes a sensing device having a sensor for sensing a characteristic of the fluid flow, wherein the sensing device generates flow meter data responsive to the characteristic and a processing device communicated with the sensing device, wherein the processing device receives and processes the flow meter data to generate meter data indicative of the fluid.

For a flow meter having at least one sensing device for measuring a parameter of a fluid flowing within a pipe, a machine-readable computer program code is provided, wherein the program code includes instructions for causing a controller to implement a method of processing flow meter data to filter out signal noise, wherein the method includes defining the flow meter data as a k-ω plane, wherein the k-ω plane includes a first k-plane quadrant separated from a second k-plane quadrant by a predetermined axis, wherein the flow meter data includes a first data set disposed within the first k-plane quadrant and a second data set disposed within the second k-plane quadrant and wherein the first data set and the second data set are disposed symmetrically about the predetermined axis and subtracting the first data set from the second data set to obtain a resultant data set

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the drawing wherein like items are numbered alike in the various Figures.

DETAILED DESCRIPTION

As described in U.S. Pat. No. 6,354,147, filed on Jun. 25, 1999, U.S. Pat. No. 6,691,584, filed on Jul. 2, 1999, U.S. Pat. No. 6,587,798, filed on Nov. 28, 2001, U.S. Pat. No. 6,609,069, filed on Dec. 4, 2000, U.S. patent application Ser. No. 10/349,716, filed on Jan. 23, 2003, and U.S. patent application Ser. No. 10/376,427, filed on Feb. 26, 2003, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process.

Figure 1:
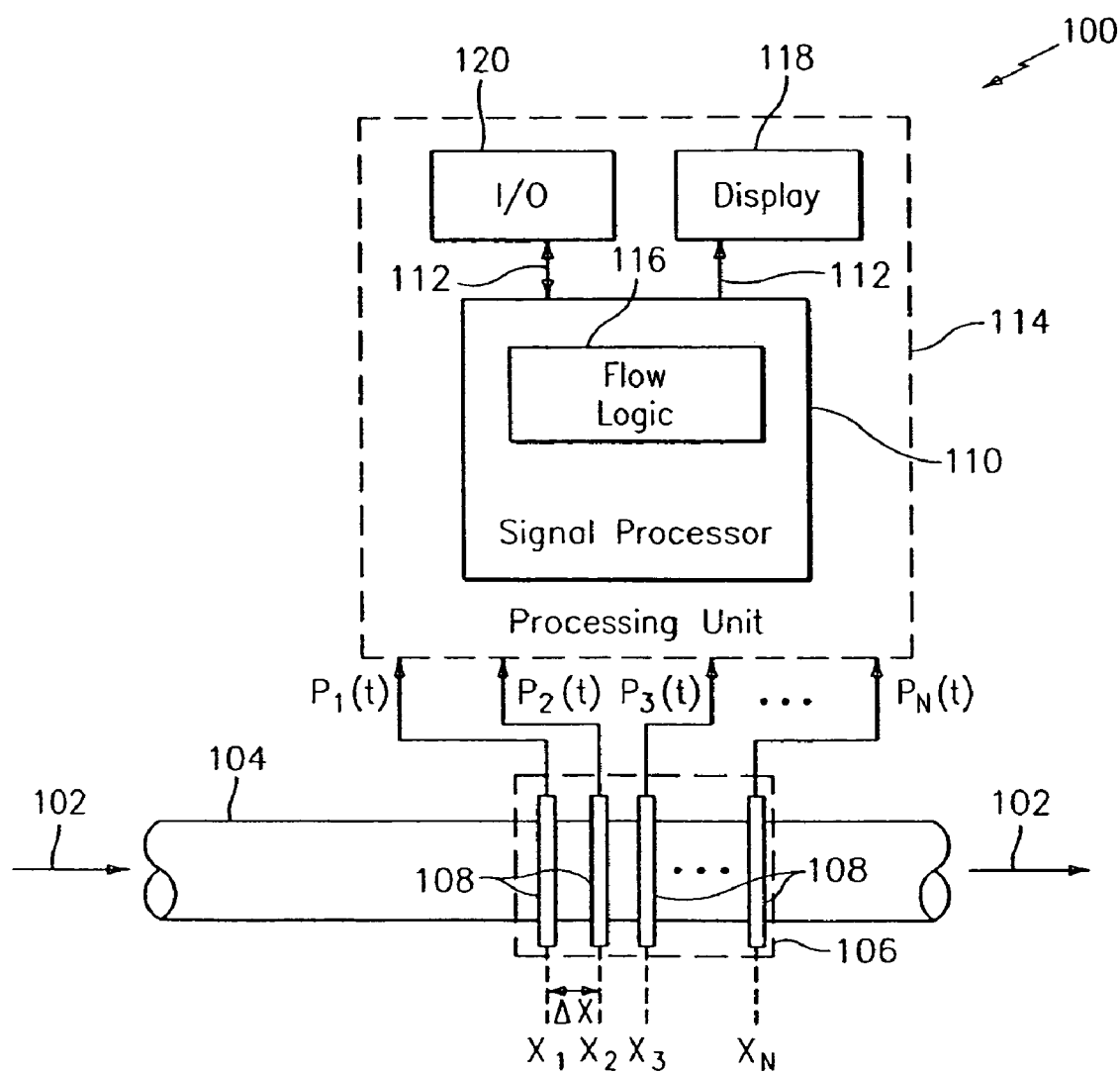
FIG. 1 is schematic diagram of an apparatus for determining at least one parameter associated with a fluid flowing in a pipe in accordance with various embodiments of the present invention.

Referring to FIG. 1, an apparatus 100 for measuring at least one parameter associated with a fluid 102 flowing within a pipe 104 is shown. The parameter of the fluid 102 may include, for example, at least one of: velocity of the fluid, speed of sound in the fluid, density of the fluid, volumetric flow rate of the fluid, mass flow rate of the fluid, composition of the fluid, entrained air in the fluid, consistency of the fluid, and size of particles in the fluid. The fluid 102 may be a single or multiphase fluid 102 flowing through a duct, conduit or other form of pipe 104.

The apparatus 100 includes a spatial array 106 of at least two pressure sensors 108 disposed at different axial locations $x_1 \ldots x_N$ along the pipe 104. Each of the pressure sensors 108 provides a pressure signal P(t) indicative of unsteady pressure within the pipe 104 at a corresponding axial location $x_1 \ldots x_n$ of the pipe 104. A signal processor 110 receives the pressure signals $P_1(t) \ldots P_N(t)$ from the pressure sensors 108 in the array 106, determines the parameter of the fluid 102 using pressure signals from selected ones of the pressure sensors 108, and outputs the parameter as a signal 112. The signal processor 110 applies array-processing techniques to the pressure signals $P_1(t) \ldots P_N(t)$ to determine the velocity, speed of sound of the fluid 102, and/or other parameters of the fluid 102. More specifically, the signal processor 110 constructs from the signals at least a portion of a k-ω plot. The signal processor 110 then identifies a ridge in the k-ω plot. The slope of the ridge is assumed to be the fluid velocity or sound velocity or correlated to the fluid velocity or sound velocity in a known way. Thus, using the slope of the ridge, the parameters of the fluid 102 can be determined.

While the apparatus 100 is shown as including four pressure sensors 108, it is contemplated that the array 106 of pressure sensors 108 includes two or more pressure sensors 108, each providing a pressure signal P(t) indicative of unsteady pressure within the pipe 104 at a corresponding axial location X of the pipe 104. For example, the apparatus may include 2, 3, 4, 5, 6, 7, 8, 9, 10, 11, 12, 13, 14, 15, 16, 17, 18, 19, 20, 21, 22,23, or 24 pressure sensors 108. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desired update rate of the output parameter provided by the apparatus 100.

The signals $P_1(t) \ldots P_N(t)$ provided by the pressure sensors 108 in the array 106 are processed by the signal processor 110, which may be part of a larger processing unit 114. For example, the signal processor 110 may be a microprocessor and the processing unit 114 may be a personal computer or other general purpose computer. It is contemplated that the signal processor 110 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

To determine the one or more parameters 112 of the flow process, the signal processor 110 applies the data from the selected pressure sensors 108 to flow logic 116 executed by signal processor 110. The flow logic 116 is described in further detail hereinafter.

The signal processor 110 may output the one or more parameters 112 to a display 118 or another input/output (I/O) device 120. The I/O device 120 also accepts user input parameters as may be necessary for the flow logic 116. The I/O device 120, display 118, and signal processor 110 unit may be mounted in a common housing, which may be attached to the array 106 by a flexible cable, wireless connection, or the like. The flexible cable may also be used to provide operating power from the processing unit 114 to the array 106 if necessary.

The pressure sensors 108 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor and the pipe 104. The sensors 108 may alternatively be removable or permanently attached via known mechanical techniques such as mechanical fastener, spring loaded, clamped, clam shell arrangement, strapping or other equivalents.

Alternatively, strain gages, including optical fibers and/or gratings, may be embedded in a composite pipe 104. If desired, for certain applications, gratings may be detached from (or strain or acoustically isolated from) the pipe 104 if desired. It is also within the scope of the present invention that any other strain sensing technique may be used to measure the variations in strain in the pipe 104, such as highly sensitive piezoelectric, electronic or electric, strain gages attached to or embedded in the pipe 104.

In various embodiments of the present invention, a piezoelectronic pressure transducer may be used as one or more of the pressure sensors and it may measure the unsteady (or dynamic or ac) pressure variations inside the pipe 104 by measuring the pressure levels inside the pipe. In one embodiment of the present invention, the sensors 104 comprise pressure sensors manufactured by PCB Piezotronics of Depew, N.Y. For example, in one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The pressure sensors 108 may incorporate a built-in MOSFET microelectronic amplifier to convert the high-impedance charge output into a low-impedance voltage signal. The sensors 108 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore the present invention contemplates that each of the pressure sensors 108 may include a piezoelectric sensor that provides a piezoelectric material to measure the unsteady pressures of the fluid 102. The piezoelectric material, such as the polymer, polarized fluoropolymer, PVDF, measures the strain induced within the process pipe 104 due to unsteady pressure variations within the fluid 102. Strain within the pipe 104 is transduced to an output voltage or current by the attached piezoelectric sensors 108.

The PVDF material forming each piezoelectric sensor 108 may be adhered to the outer surface of a steel strap that extends around and clamps onto the outer surface of the pipe 104. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual", published Apr. 2, 1999, provided by Measurement Specialties, Inc. of Fairfield, N.J., which is incorporated herein by reference. The advantages of this technique are the following:

1. Non-intrusive flow rate measurements,
2. Low cost,
3. Measurement technique requires no excitation source. Ambient flow noise is used as a source,
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vertical noise detection, d) tailored sensor geometries to minimize sensitivity to pipe modes, e) differencing of sensors to eliminate acoustic noise from vortical signals, and
5. Higher Temperatures (140 C) (co-polymers).

It should be appreciated that sensor(s) 108 may be any type of sensor suitable to the desired end purpose, such as a conductivity based sensor, a temperature based sensor, a density based sensor or any other sensor that measures a property of fluid that convects with the flow.

Flow Logic

Velocity Processing

Figure 2:
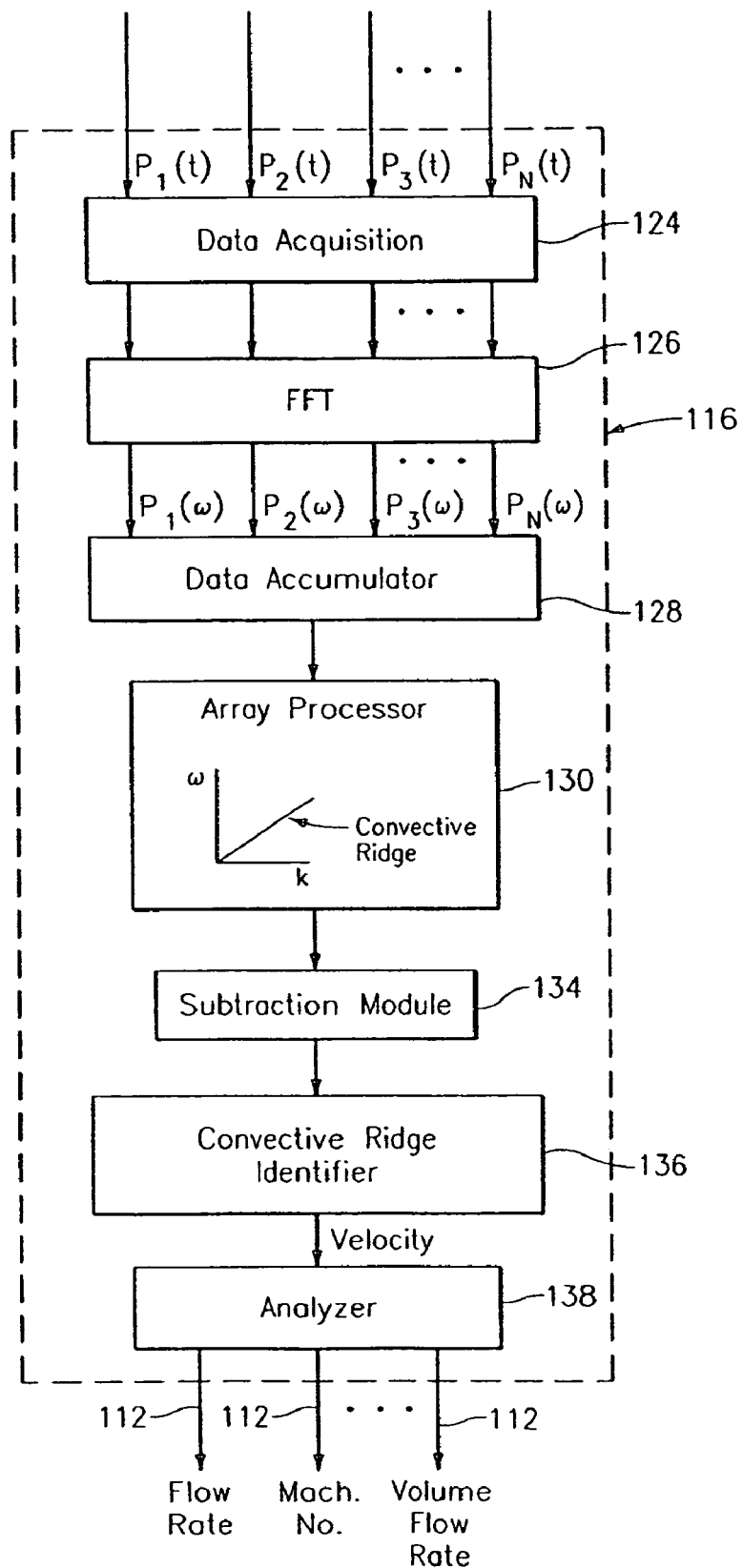
FIG. 2 is a block diagram of a first embodiment of a flow logic used in the apparatus of the present invention.

Referring to FIG. 2, flow logic 116 used for determining parameters related to convective flow of the fluid 102 in accordance with the present invention is shown. As previously described, the array 106 of at least two sensors 108 located at two locations $x_1$, $x_2$ axially along the pipe 104 sense respective stochastic signals propagating between the sensors 108 within the pipe 104 at their respective locations. Each sensor 108 provides a signal indicating an unsteady pressure at the location of each sensor 108, at each instant in a series of sampling instants. One will appreciate that the array 106 may include more than two sensors 108 distributed at locations $x_1 \ldots x_N$. The pressure generated by the convective pressure disturbances (e.g., eddies 140, see FIG. 3) may be measured through strained-based sensors 108 and/or pressure sensors 108. The sensors 108 provide analog pressure time-varying signals $P_1(t), P_2(t), P_3(t) \ldots P_N(t)$ to the signal processor 110, which in turn applies selected ones of these signals $P_1(t), P_2(t), P_3(t), \ldots P_N(t)$ to the flow logic 116.

The flow logic 116 processes the selected signals $P_1(t), P_2(t), P_3(t), \ldots P_N(t)$ to first provide output signals (parameters) 112 indicative of the pressure disturbances that convect with the fluid (process flow) 102, and subsequently, provide output signals (parameters) 112 in response to pressure disturbances generated by convective waves propagating through the fluid 102, such as velocity, Mach number and volumetric flow rate of the process flow 102.

The signal processor 110 includes data acquisition unit 124 (e.g., A/D converter) that converts the analog signals $P_1(t) \ldots P_N(t)$ to respective digital signals and provides the digital signals $P_1(t) \ldots P_N(t)$ to FFT logic 126. The FFT logic 126 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form one or more frequency domain transfer functions (or frequency responses or ratios) discussed hereinafter.

One technique of determining the convection velocity of the turbulent eddies 140 within the process flow 102 is by characterizing a convective ridge of the resulting unsteady pressures using an array of sensors 106 or other beam forming techniques, similar to that described in U.S. Pat. No. 6,691,584, filed on Jul. 2, 1999 and U.S. Pat. No. 6,609,069, filed on Dec. 4, 2000, which are incorporated herein by reference.

A data accumulator 128 accumulates the frequency signals $P_1(\omega)$-$P_N(\omega)$ over a sampling interval, and provides the data to an array processor 130, which performs a spatial-temporal (two-dimensional) transform of the sensor data, from the xt domain to the k-$\omega$ domain, and then calculates the power in the k-$\omega$ plane, as represented by a k-$\omega$ plot.

The array processor 130 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, Convective characteristics or parameters have a dispersion relationship that can be approximated by the straight-line equation, $k=\omega/u$, where u is the convection velocity (flow velocity). A plot of k-$\omega$ pair is obtained from a spectral analysis of sensor samples associated with convective parameters. The pairings are portrayed so that the energy of the disturbance spectrally corresponding to the pairings can be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 140 ave distributed over a range of length scales and hence temporal frequencies.

To calculate the power in the k-$\omega$ plane, as represented by a k-$\omega$ plot (see FIG. 4) of either the signals, the array processor 130 determines the wavelength and so the (spatial) wavenumber k, and also the (temporal) frequency and so the angular frequency $\omega$, of various of the spectral components of the stochastic parameter. It should be appreciated that there are numerous algorithms available in the public domain to perform the spatial/temporal decomposition of arrays of sensors 108.

The present invention may use temporal and spatial filtering to precondition the signals to effectively filter out the common mode characteristics Pcommon mode and other long wavelength (compared to the sensor spacing) characteristics in the pipe 104 by differencing adjacent sensors 108 and retaining a substantial portion of the stochastic parameter associated with the flow field and any other short wavelength (compared to the sensor spacing) low frequency stochastic parameters.

Figure 3:
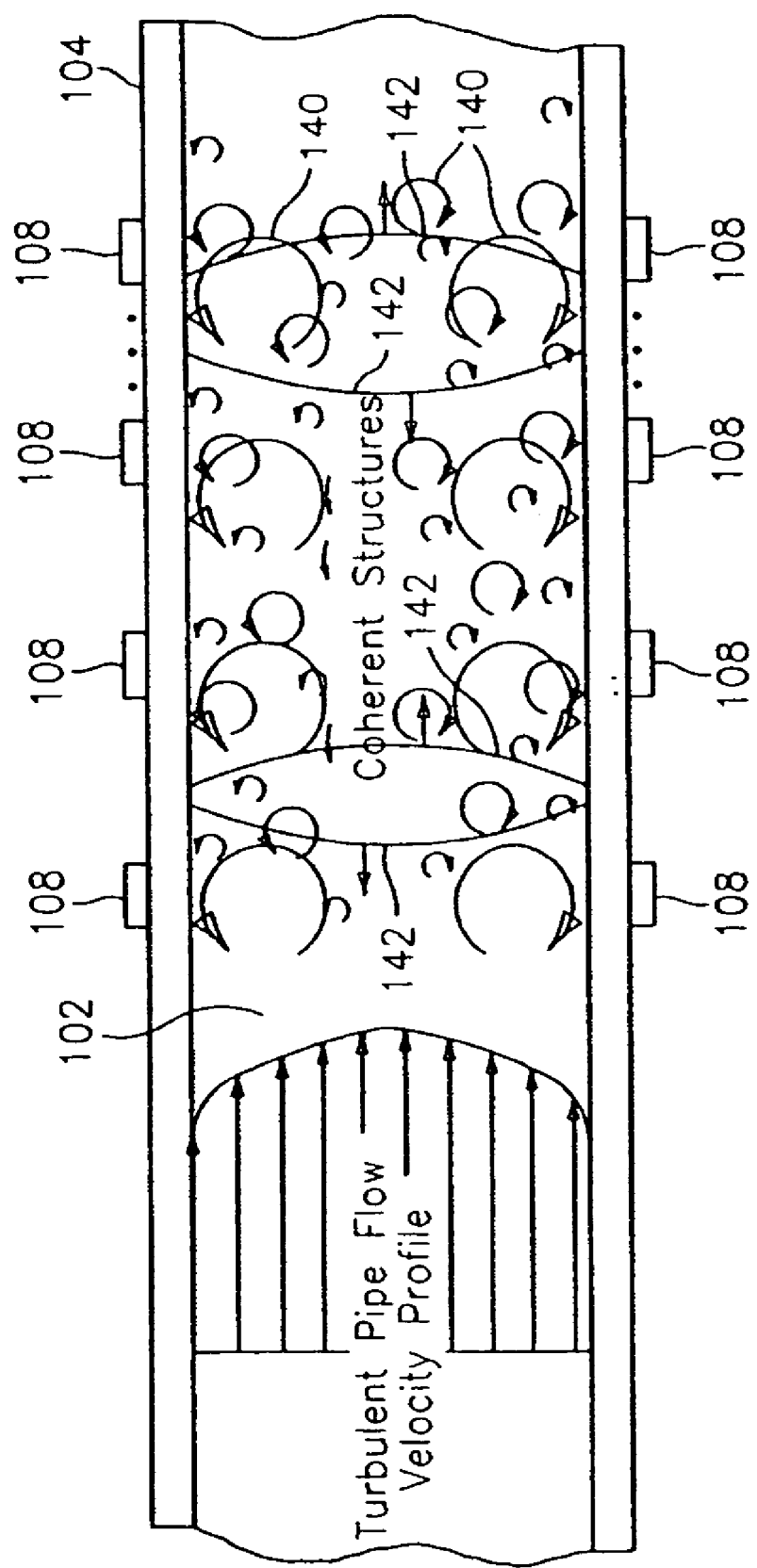
FIG. 3 is a cross-sectional view of a pipe having coherent structures therein.
Figure 4:
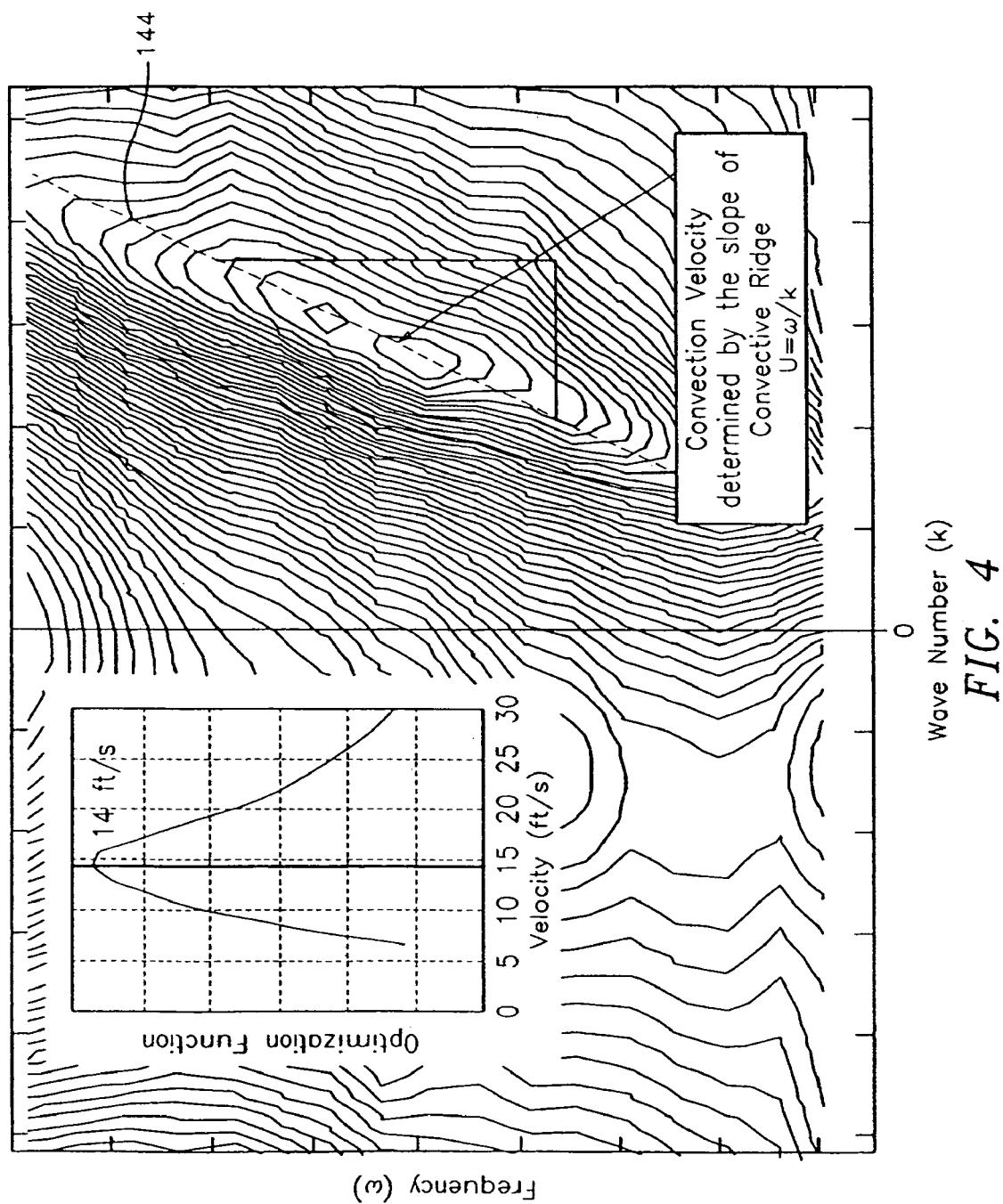
FIG. 4 is a k-ω plot of data processed from an apparatus embodying the present invention that illustrates slope of the convective ridge, and a plot of the optimization function of the convective ridge.

In the case of suitable turbulent eddies 140 (see FIG. 3) being present, the power in the k-$\omega$ plane shown in a k-$\omega$ plot of FIG. 4 shows a convective ridge 144. The convective ridge 44 represents the concentration of a stochastic parameter that convects with the flow and is a mathematical manifestation of the relationship between the spatial variations and temporal variations described above. Such a plot will indicate a tendency for k-$\omega$ pairs to appear more or less along a line 144 with some slope, the slope indicating the flow velocity.

Figure 5:
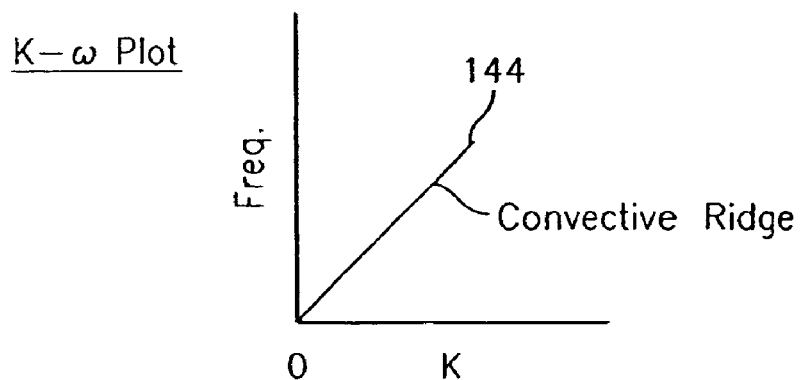
FIG. 5 is a k-ω plot of a convective ridge in the k-ω plane with an origin of zero.

As discussed briefly hereinabove, the flow meter may include an array of sensors 108, such as strain-based sensors 108 and pressure sensors 108, disposed longitudinally along a pipe 104, as shown in FIG. 1. As described in some of the herein-referenced patent applications and patents, such as U.S. Pat. No. 6,609,069, the data received from the array of sensors 108 is processed to define a convective ridge 144 in the k-$\omega$ plane, wherein the convective ridge 144 is indicative of the speed that the vortical disturbances or eddies 140 propagate past or through the array of sensors 108. The rate of propagation of the vortices past the sensors 108 is indicative of the velocity and/or volumetric flow rate of the fluid 102 in the pipe 104, as described in greater detail in the references noted hereinbefore. The slope of the convective ridge 144 is indicative of the velocity of the fluid flow. Generally, the convective ridge 144 plots onto a sloped line in the k-$\omega$ plane with an origin of zero (0), as shown in FIG. 5.

Figure 6:
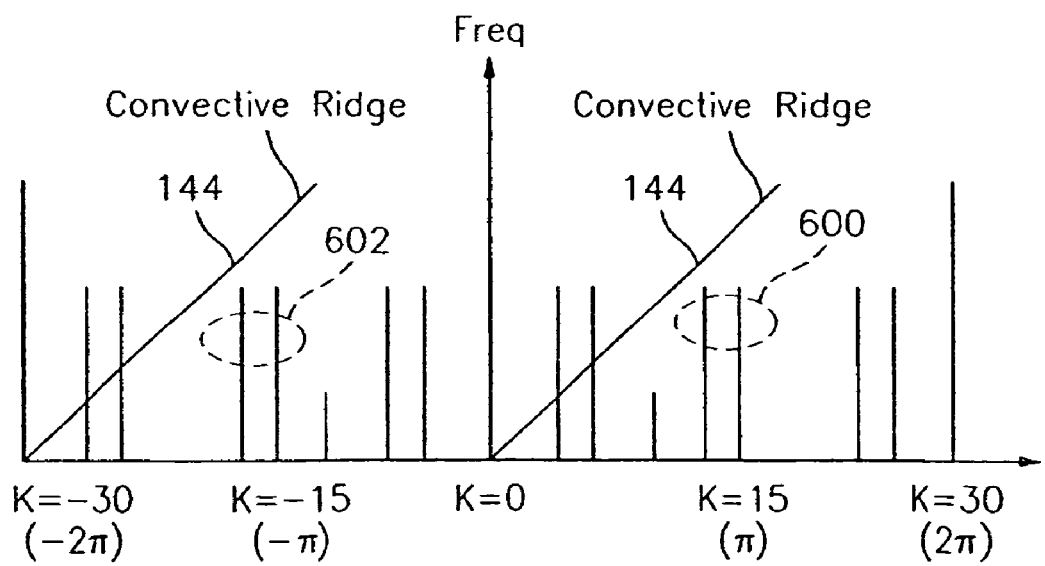
FIG. 6 is a k-ω plot showing convective ridges and unwanted energy in the negative and positive k-ω planes.

However, flow measurements may be corrupted or may include unwanted energy or signals that cause the convective ridge data (or vortical flow ridge data) to be partially or wholly indiscernible altogether. Examination of this unwanted energy over a broad range of environments reveals that, in many instances, much of this unwanted energy has a common property that is not shared with the vortical ridge and is in fact symmetrically distributed in the k-$\omega$ domain about the k=0 axis. In other words, as shown in FIG. 6, this unwanted energy is repeated every $2\pi$ along the frequency axis (k axis). It is this repetitious nature of the unwanted energy that allows the obtained data to be processed further to be better able to identify the convective ridge 144 and the slope of that convective ridge 144. The present invention allows for the elimination of the symmetrically disposed unwanted energies by folding the k-$\omega$ plane about the axis at k=0, and then subtracting the overlapping energies from each half of the k-$\omega$ plane. In other words, the energy at symmetrical locations about the k=0 axis are subtracted, i.e. filtered, while the non-symmetrical energy remains. Consequently, energy patterns that manifest itself as a vertical or horizontal pattern would be filtered out, while sloped energy patterns (e.g., a convective ridge 144) would remain and not be filtered. Additionally, it should be appreciated that the present invention allows for the attenuation of other noise as well, such as non-symmetrical noise having different amplitudes or power around the k=0 axis.

Figure 7:
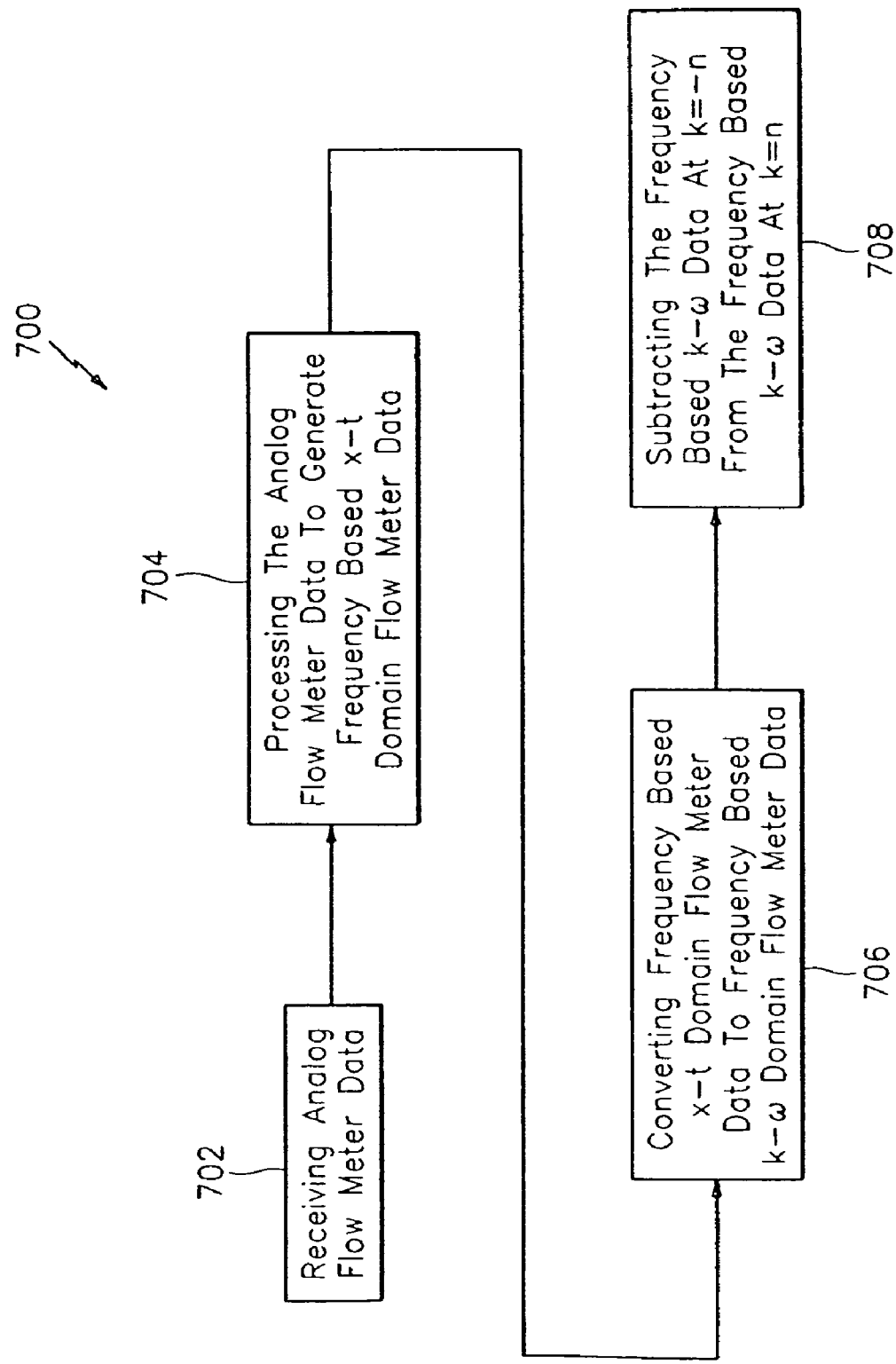
FIG. 7 is a block diagram illustrating a method for processing flow meter data to remove unwanted energy in accordance with the present invention.

For example, referring again to FIG. 6 the vertical energy (shown as vertical lines 600) across the frequency range k=15 may be subtracted from the vertical energy (shown as vertical line 602) across the frequency range k=−15 to filter out this unwanted energy. Referring to FIG. 7 and back to FIG. 2, a block diagram illustrating a method 700 for filtering out the unwanted energy across a frequency range in the k-ω plane is shown and includes receiving analog flow meter data from the sensing device 108, as shown in block 702. As discussed hereinbefore, the analog flow meter data may be acquired and processed via the data acquisition unit 124 to generate frequency based x-t domain flow meter data, as shown in block 704, wherein the frequency based x-t domain flow meter data is converted to frequency based k-ω domain flow meter data via the FFT unit 126, as shown in block 706. The frequency based k-ω domain flow meter data disposed in the negative k-plane (k<0) may then be subtracted from the frequency based k-ω domain flow meter data disposed at a correspondingly symmetrical point in the positive k-plane (k>0) via a subtraction module 134, as shown in block 708. In essence, the k-ω plane is folded (i.e. inverted along the frequency plane k such that k=−n to k=n) is about the axis at k=0, and the overlapping energies from each half of the k-ω plane are subtracted. Thus, all energy that is symmetrical about the k=0 axis is filtered out, while desired energy or the non-symmetrical energy remains. Consequently, the energy pattern that manifests itself as a vertical (slope=∞) pattern or a horizontal pattern (slope=0) would be filtered out, while the energy pattern indicative of the convective ridge 144 (0<slope<∞) would remain. It should be appreciated that the present invention also acts to attenuate the magnitude of any non-symmetrical vertical and horizontal unwanted energies.

Figure 8:
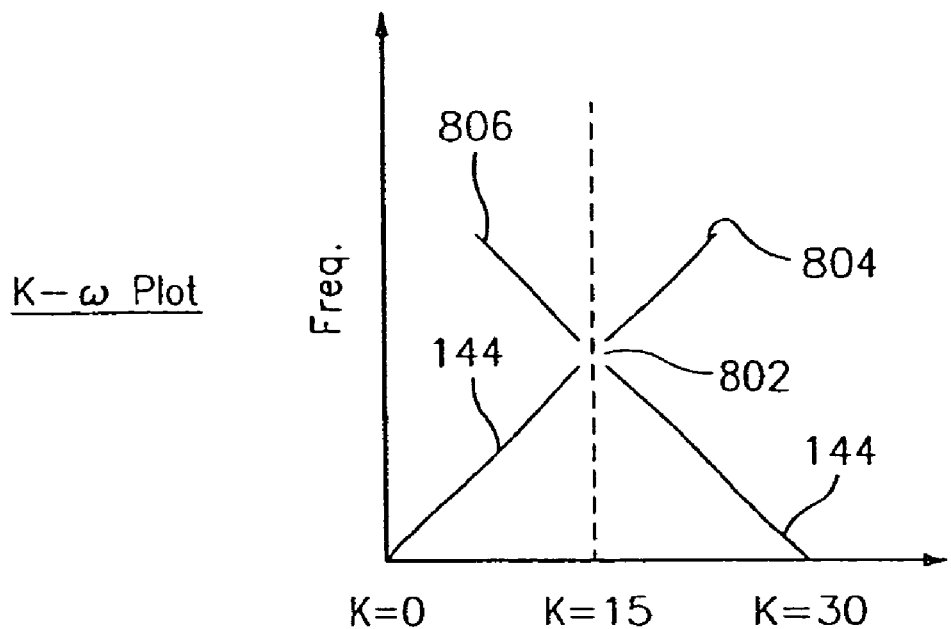
FIG. 8 is a resultant k-ω plot with the negative k-plane subtracted from the positive k-plane.
Figure 9:
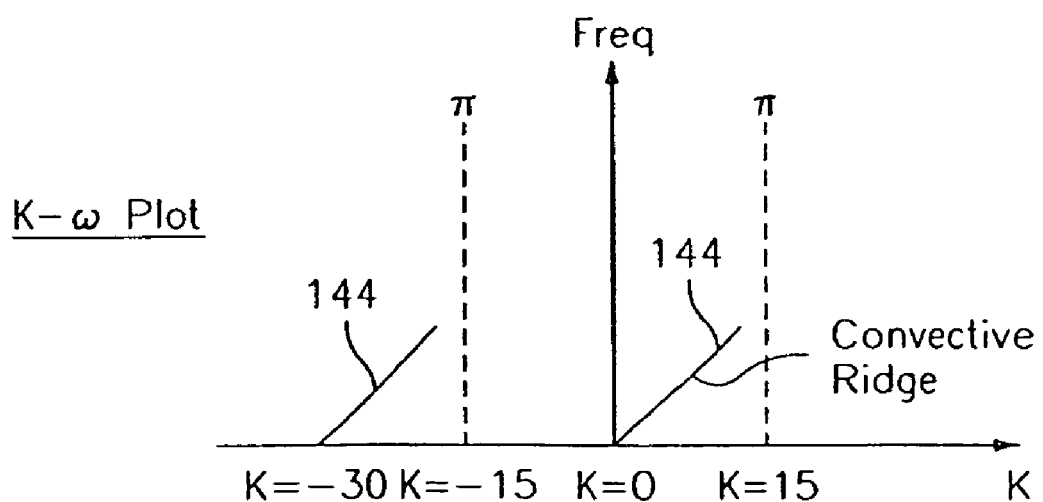
FIG. 9 is a k-ω plot showing convective ridges that do not extend beyond k=15 (k=π).

For example, referring again to FIG. 6, the vertical energy across the frequency range at k=15 (shown as line 600) would be subtracted from the vertical energy symmetrically disposed on the opposite side of the k=0 axis or the vertical energy across the frequency range at k=−15 (shown as line 602) leaving a resultant energy of zero. As such, when subtracting the convective ridge 144 in the positive k-plane from the convective ridge in the negative k-plane symmetrically about the k=0 axis, a substantial portion if not the entire convective ridge remains. This can be seen by referring to FIG. 8 which illustrates the resulting k-ω plot when the negative k-plane is folded onto the positive k-plane and subtracted. It should be appreciated that if the convective ridge extends past k=15 (or k=π), a portion of the energy of the convective ridge 144 will be eliminated, as shown in FIG. 8 as a 'blank area' 802 wherein the positive convective ridge 804 (in the positive k-plane) and the negative convective ridge 806 (in the negative k-plane) intersect (at about k=15). In this situation, the 'blank area' 802 of the convective ridge 144 may be considered when determining the slope of the convective ridge 144. For example, the frequency range of the data used to determine the slope of the convective ridge 144 may be selected to measure a portion of the convective ridge 144 before or after the 'blank area' 802 of the convective ridge 144. Alternatively, a frequency range that includes at least a portion of the 'blank area' 802 of the convective ridge 144 may be selected as data to determine the slope of the convective ridge 144. In this case the processor 110 may extrapolate the known data to compensate for the 'blank area' 802 of the convective ridge 144. It should be further appreciated that the dimensions or amount of 'blank area' 802 of the convective ridge 144 is typically dependent on the width of the convective ridge 144. Thus, the wider the width of the convective ridge 144, the larger the 'blank area' 802 of the convective ridge 144. Similarly, the shallower the slope of the convective ridge 144, the larger the 'blank area' 802 of the convective ridge 144 or conversely the thinner the width of the convective ridge 144 or the steeper the slope of the convective ridge 144, the smaller the 'blank area' 802 of the convective ridge 144. Furthermore, it should be appreciated that this overlapping or 'blank area' 802 does not present a problem for convective ridges 144 that do not extend beyond the k=15 (k=π) axis, as shown in FIG. 9. This is because during the 'folding over' procedure, the positive convective ridge 902 and the negative convective ridge 904 do not overlap. Additionally, a small portion of the convective ridge 144 about the k=0 axis for the approximate range of k=0.0 to k=0.5 may also be filtered out.

Figure 10:
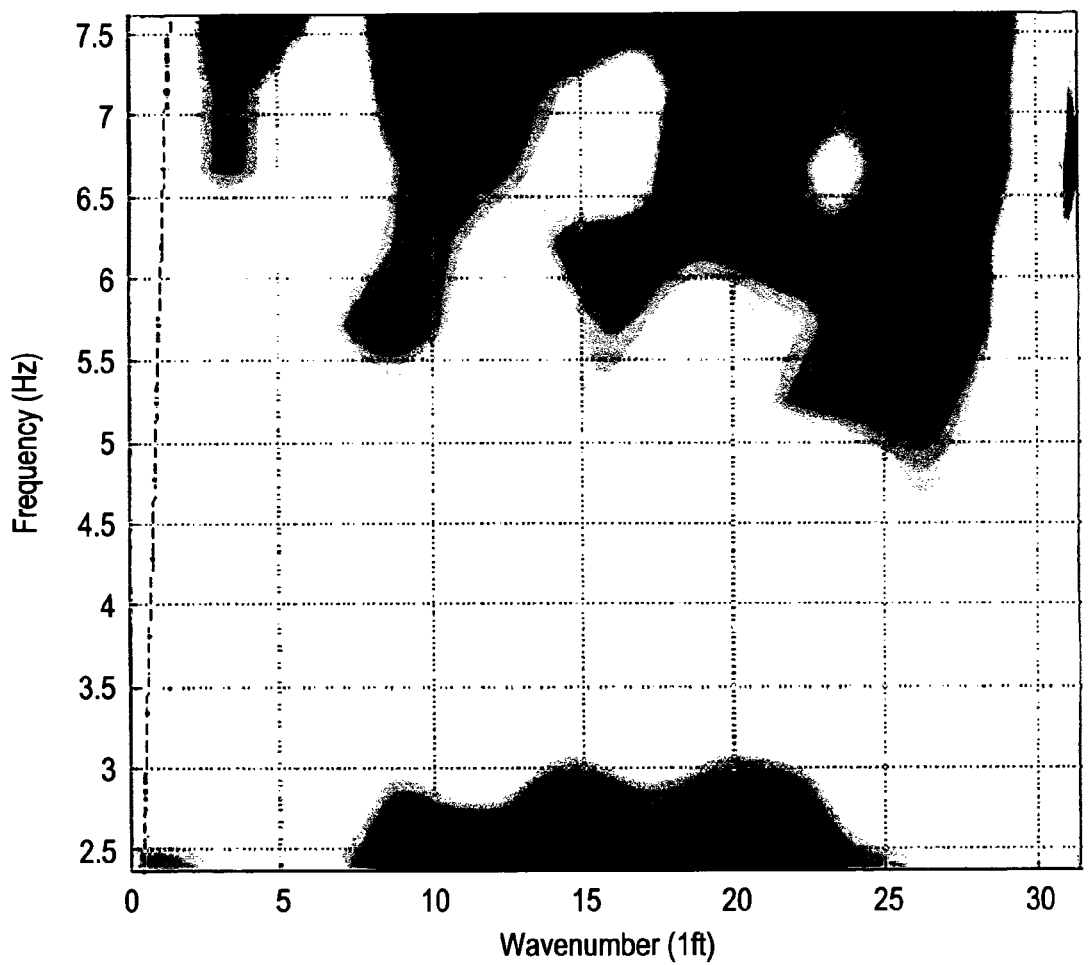
FIG. 10 is a plot of the kω plane from k=0–30 wherein the signals of adjacent sensors are differenced.
Figure 11:
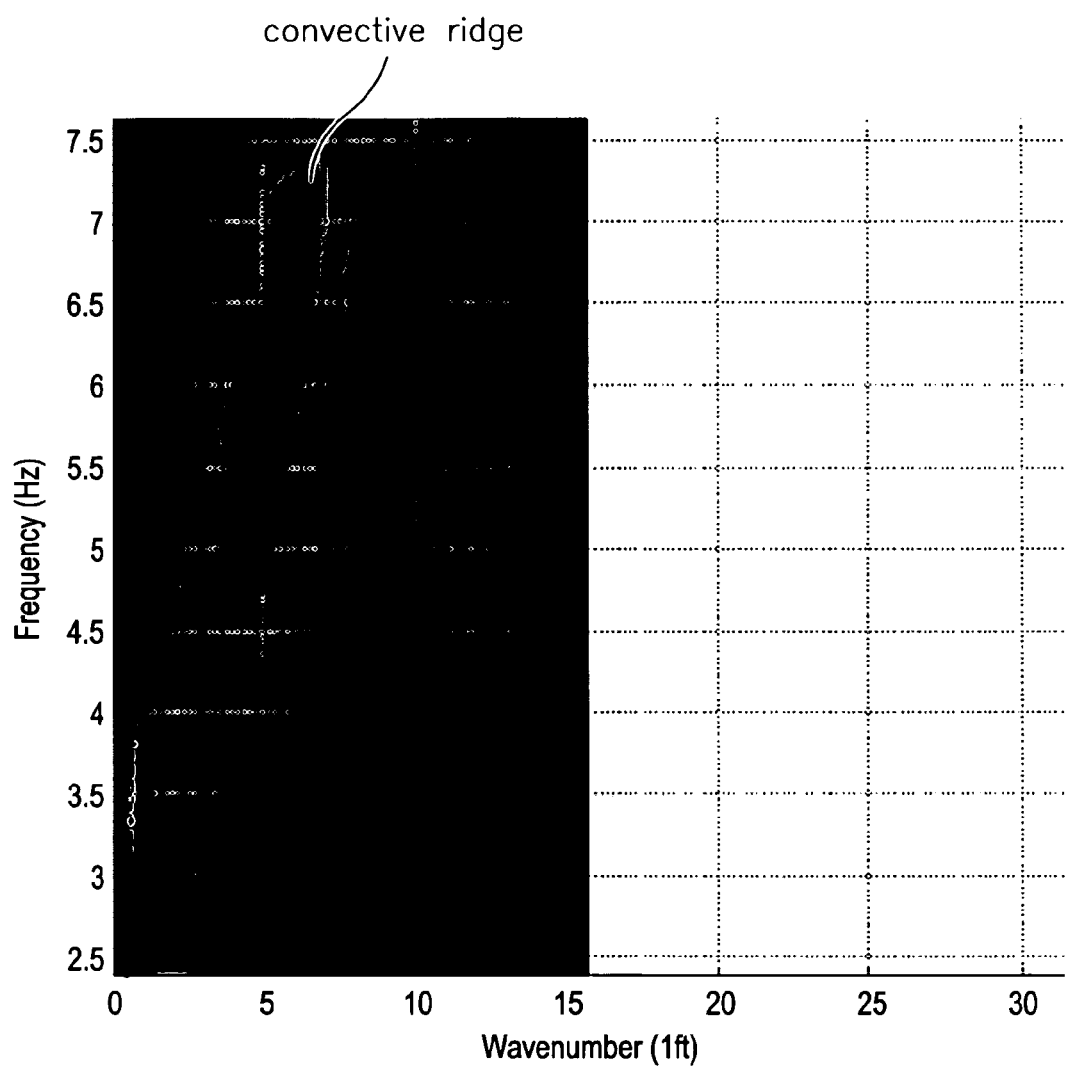
FIG. 11 plot of the kω plane of FIG. 10 with the method of FIG. 7 applied.
Figure 12:
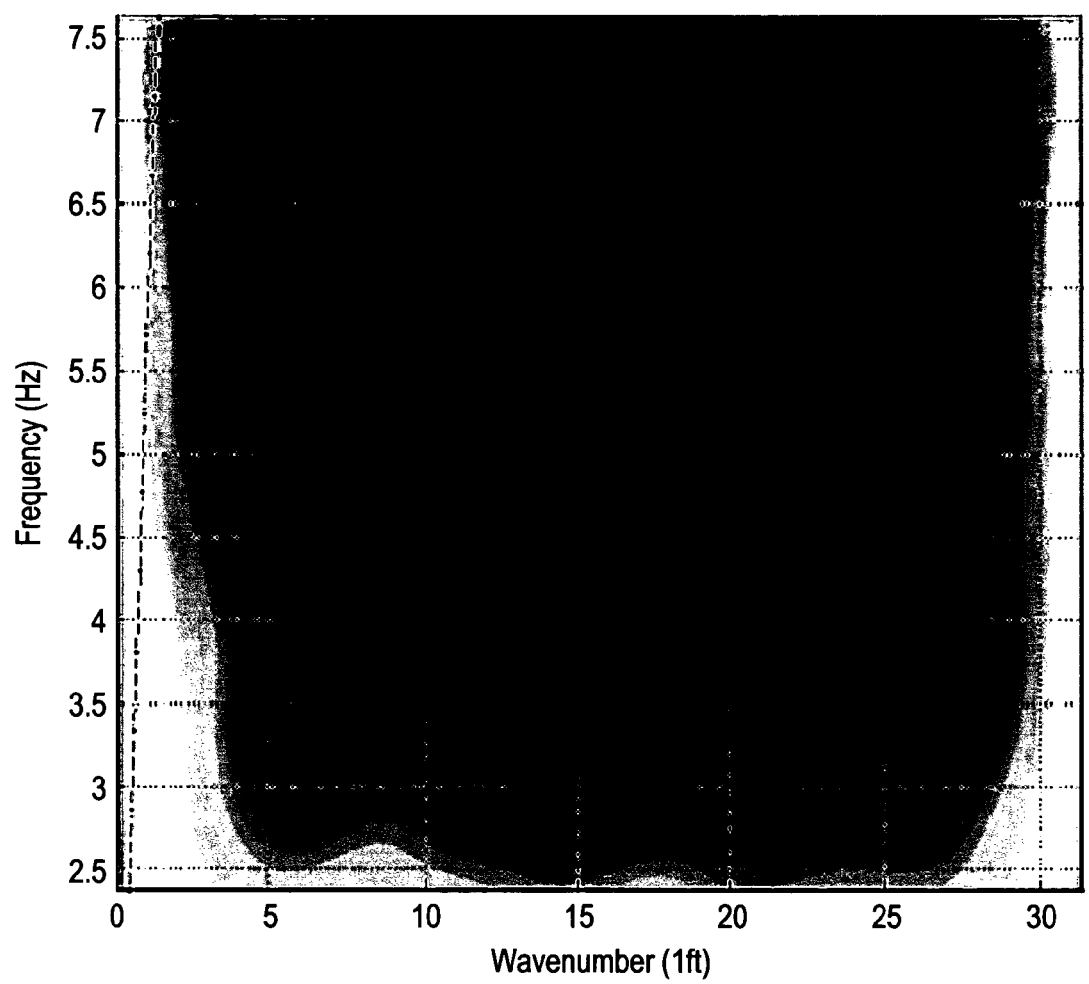
FIG. 12 is a plot of the kω plane from K=0–30 wherein the signals of adjacent sensors are not differenced.
Figure 13:
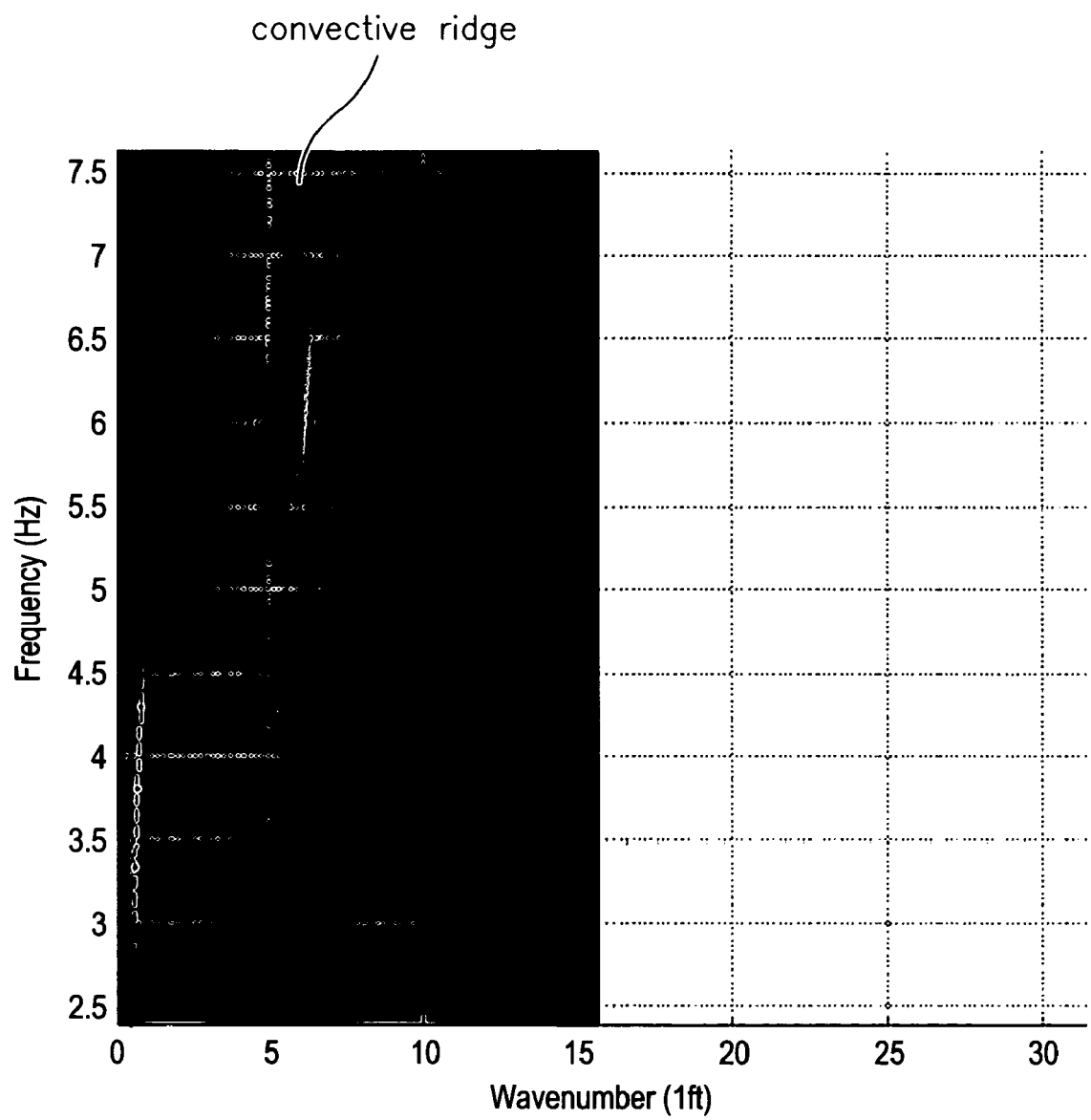
FIG. 13 is a plot of the kω plane of FIG. 12 with the method of FIG. 7 applied.

Referring to FIG. 10, a plot of the k-ω plane from k=0 to k=30 is shown, wherein the signals of the adjacent sensors have been differenced. As can be seen, the plot shows a high degree of unwanted signals. However, when the method described hereinbefore was applied to the same data to filter out the unwanted signals (symmetrically about the k=0 axis), the resulting convective ridge shown in FIG. 11 remained. Similarly, referring to FIG. 12, a plot of the k-ω plane from k=0 to k=30 is shown where the signals of adjacent sensors have not been differenced. The convective ridge 144 cannot be readily identified. However, when the method described hereinbefore was applied to the same data to filter out the unwanted signals (symmetrically about the k=0 axis), the resulting convective ridge shown in FIG. 13 remained. Thus in both cases, the processing of the data in accordance with the present invention results in a clearly defined and identifiable convective ridge 144 enabling a more reliable determination of their slopes. It should be appreciated that the unwanted signals that are symmetrical about the k=0 axis may include standing waves and pipe modes which are filtered out, while the traveling waves (such as those generated by the vortical disturbances) are not filtered out. It should be appreciated that the method discussed hereinabove may be performed via a subtraction module 134 as shown in FIG. 2 or via the array processor 130. For illustrative purposes, the energies symmetrical about the k=0 axis are shown as discrete vertical and horizontal patterns, however, the invention contemplates and filters any energy pattern that is symmetrical about the k=0 pattern regardless of how the energies are created or formed.

Once the power in the k-ω plane is determined, a convective ridge identifier 136 uses one or another feature extraction method to determine the location and orientation (slope) of any convective ridge 144 present in the k-ω plane. In one embodiment, the convective ridge identifier 136 accumulates energy (power) of k-ω pairs in the k-ω plot along different rays emanating from the origin, each different ray being associated with a different trial velocity (in that the slope of a ray is assumed to be the fluid velocity or correlated to the fluid velocity in a known way). The convective ridge identifier 136 may accumulate energy for each array by summing the energy of k-ω pairs along the ray. Alternatively, other methods of accumulating energy along the ray (e.g., averaging) may be used. In any case, accumulated energy is determined for a range of trial velocities between a predetermined minimum velocity and a predetermined maximum velocity. The convective ridge 144 has an orientation that is the slope of the ray having the largest accumulated energy. The convective ridge identifier 136 provides information about the different trial velocities, information referred to generally as convective ridge 144 information.

The analyzer 138 examines the convective ridge 144 information including the convective ridge 144 orientation (slope). Assuming the straight-line dispersion relation given by k=ω/u, the analyzer 138 determines the flow velocity, Mach number and/or volumetric flow, which are output as parameters 112. The volumetric flow is determined by multiplying the cross-sectional area of the inside of the pipe 104 with the velocity of the process flow 102.

Some or all of the functions within the flow logic 116 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 14:
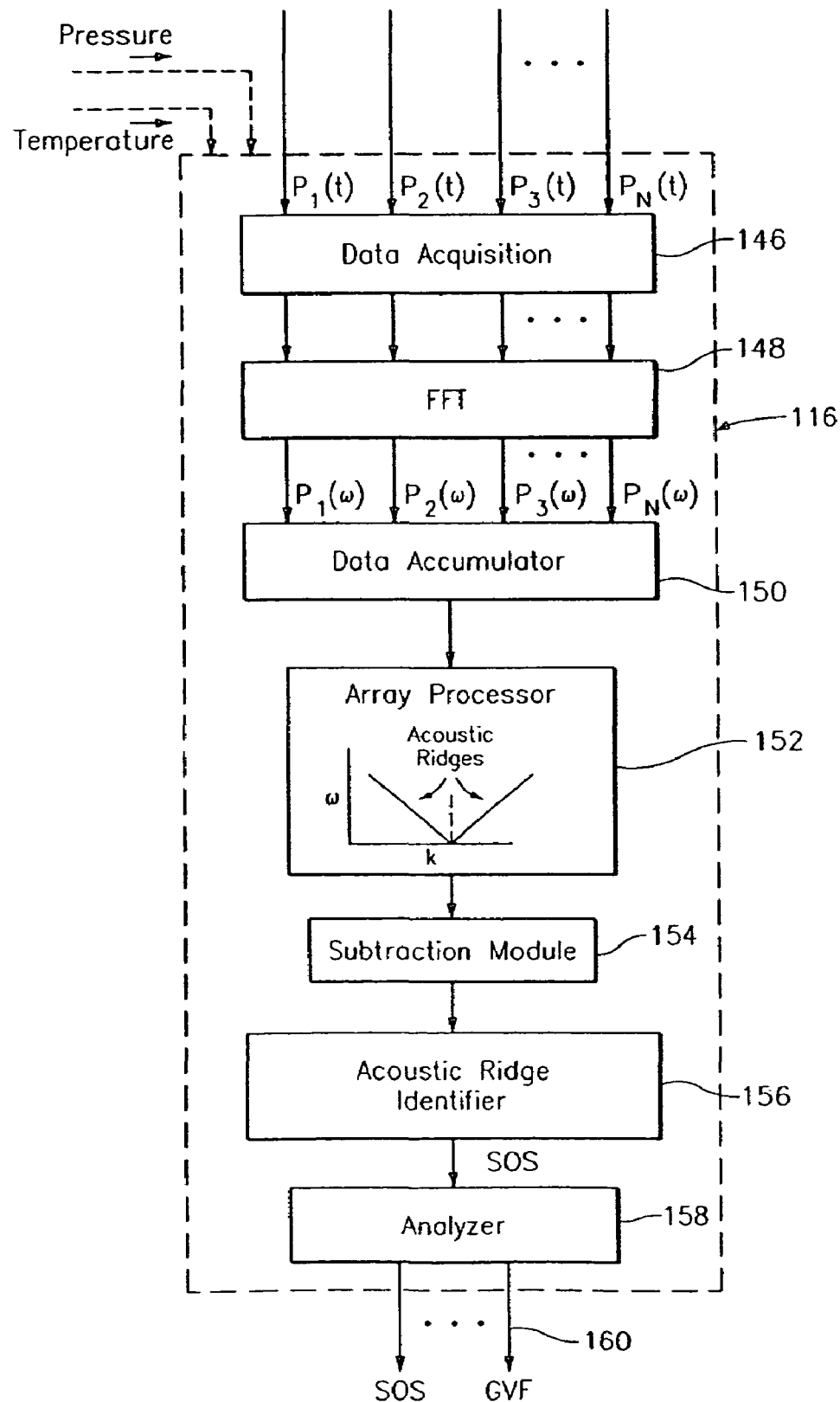
FIG. 14 is a block diagram of a second embodiment of a flow logic used in the apparatus of the present invention.

Referring to FIG. 14, flow logic 116 used for determining parameters related to acoustic flow of the fluid 102 in accordance with the present invention is shown. While the examples of FIG. 3 and FIG. 14 are shown separately, it is contemplated that the flow logic 116 may perform all of the functions described with reference to FIG. 3 and FIG. 14. As previously described, the array 106 of at least two sensors 108 located in at least two locations x1, x2 axially along the pipe 104 sense respective stochastic signals propagating between the sensors 108 within the pipe 104 at their respective locations. Each sensor 108 provides a signal indicating an unsteady pressure at the location of each sensor 108, at each instant in a series of sampling instants. One will appreciate that the sensor array 106 may include more than two pressure sensors 108 distributed at locations $X_1 \ldots X_N$. The pressure generated by the acoustic pressure disturbances (e.g., acoustic waves 142, see FIG. 3) may be measured through strained-based sensors 108 and/or pressure sensors 108. The sensors 108 provide analog pressure time-varying signals $P_1(t), P_2(t), P_3(t), \ldots P_N(t)$ to the flow logic 116. The flow logic 116 processes the signals $P_1(t), P_2(t), P_3(t), \ldots P_N(t)$ from the sensors 108 to first provide output signals indicative of the speed of sound propagating through the fluid (process flow) 102, and subsequently, provide output signals in response to pressure disturbances generated by acoustic waves propagating through the process flow 102, such as velocity, volumetric flow rate of the process flow, phrase fraction, composition, gas volume fraction and other flow parameters which will be described herein.

The signal processor 110 receives the pressure signals from the array 106 of sensors 108. A data acquisition unit 146 digitizes selected ones of the pressure signals $P_1(t) \ldots P_N(t)$ associated with the acoustic waves 142 propagating through the pipe 104. Similarly to the FFT logic 126 of FIG. 2, an FFT logic 148 calculates the Fourier transform of the selected digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals.

A data accumulator 150 accumulates the frequency signals $P_1(\omega) \ldots P_N(\omega)$ over a sampling interval, and provides the data to an array processor 152, which performs a spatial-temporal (two-dimensional) transform of the sensor data, from the xt domain to the k-ω domain, and then calculates the power in the k-ω plane, as represented by a k-ω plot.

To calculate the power in the k-ω plane, as represented by a k-ω plot (see FIG. 15) of either the signals or the differenced signals, the array processor 152 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 108.

Figure 15:
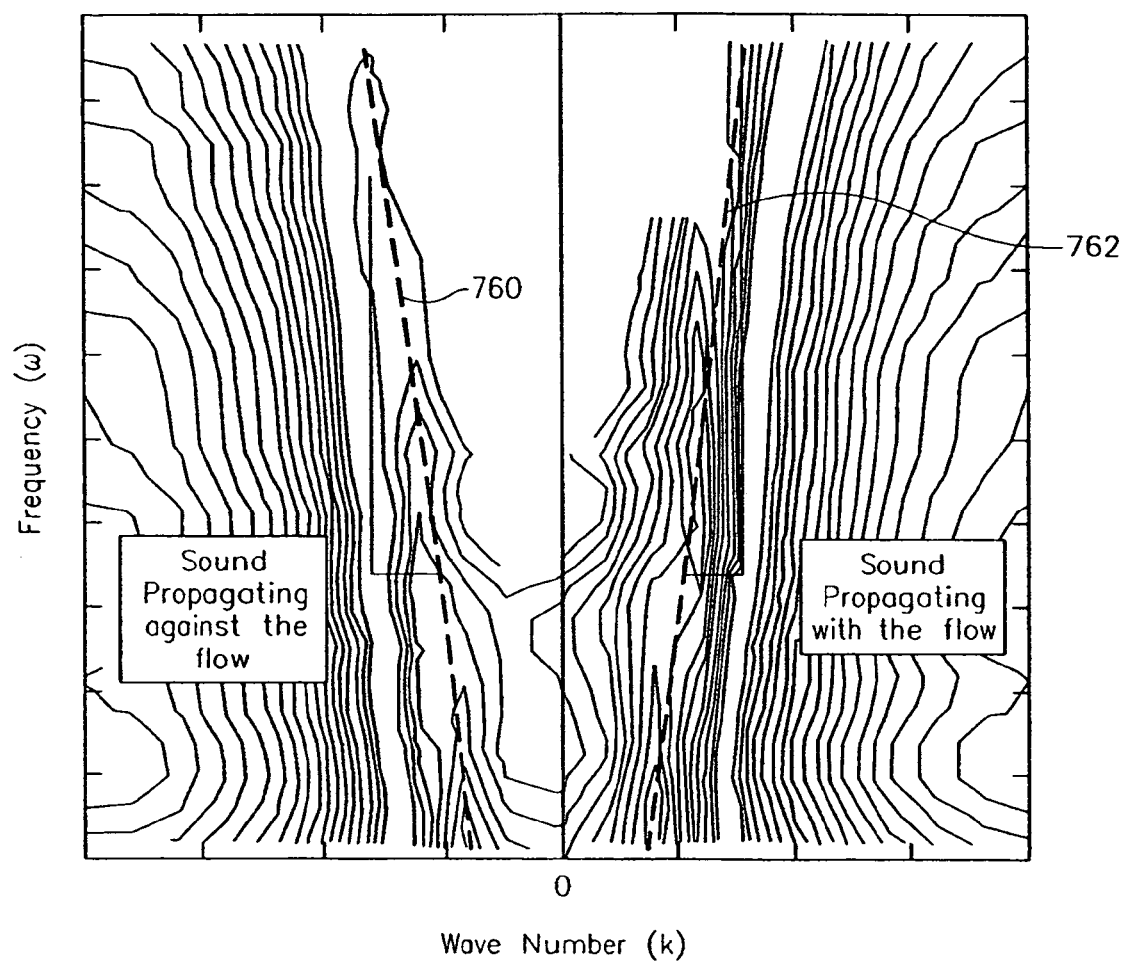
FIG. 15 a k-ω plot of data processed from an apparatus embodying the present invention that illustrates slope of the acoustic ridges.

In the case of suitable acoustic waves 142 being present in both axial directions, the power in the k-ω plane shown in a k-ω plot of FIG. 15 so determined will exhibit a structure that is called an acoustic ridge 760, 762 in both the left and right planes of the plot, wherein one of the acoustic ridges 760 is indicative of the speed of sound traveling ir one axial direction and the other acoustic ridge 762 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k-ω pairs to appear more or less along a line 760, 762 with some slope, the slope indicating the speed of sound.

Figure 16:
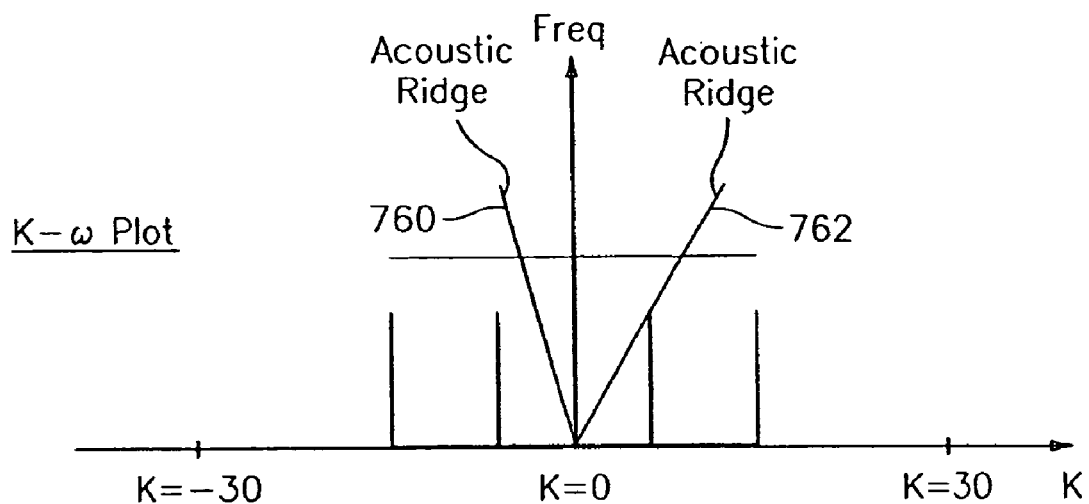
FIG. 16 is a k-ω plot showing acoustic ridges and unwanted energy in the negative and positive k-ω planes.
Figure 17:
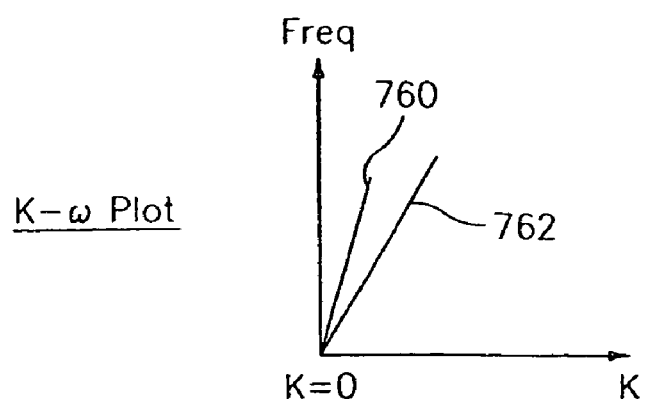
FIG. 17 is the k-ω plot of FIG. 16 with the method of FIG. 7 applied.

In a manner similar to that described hereinbefore regarding further processing the obtained data to more clearly define the convective ridge 144 via the subtraction module 134 in the k-ω plane by filtering out the unwanted symmetrical energies, the method 700 may also be used to filter out unwanted symmetrical energies to more clearly define an acoustic ridge in the k-ω plane via a subtraction module 154, as shown in FIG. 14 and FIG. 16. However, it should be appreciated that the method 700 is valid for sound propagating only in one direction through the fluid flow or when the fluid flow is moving such that the positive traveling sound wave is traveling at a different rate than the negative traveling sound wave. FIG. 17 illustrates the resulting k-ω plot when the negative k plane of FIG. 16 is folded (i.e. inverted along the frequency plane k such that k=−n to k=n) onto the positive k plane of FIG. 16 and subtracted for the situation where the positive traveling sound wave is traveling at a different rate than the negative traveling sound wave. As can be seen, the unwanted energies are filtered out and the negative acoustic ridge 760 and the positive acoustic ridge 762 remain. In instances where the rate of the negative and positive traveling sound waves (or acoustic waves) are substantially the same, then the two acoustic ridges 760, 762 will tend to cancel (or filter) each other out because the slopes of the acoustic ridges 760, 762 are substantially the same. For illustrative purposes, the energies symmetrical about the k=0 axis are shown as discrete vertical and horizontal patterns, however, the invention contemplates and filters any energy pattern that is symmetrical about the k=0 pattern regardless of how the energies are created or formed. Additionally, it should be appreciated that the method 700 discussed hereinabove regarding the convection ridges 144 and/or the acoustic ridges 760, 762 may be performed via a subtraction module 154 as shown in FIG. 2 or via the array processor 152.

The power in the k-ω plane so determined is then provided to an acoustic ridge identifier 156, which uses one or another feature extraction method to determine the location and orientation (slope) of any acoustic ridge 760, 762 present in the left and/or right k-ω plane. The velocity may be determined by using the slope of one of the two acoustic ridges 760, 762 or averaging the slopes of the acoustic ridges 760, 762.

Finally, information including the acoustic ridge orientation (slope) is used by an analyzer 158 to determine the flow parameters relating to measured speed of sound, such as the consistency or composition of the flow 102, the density of the flow 102, the average size of particles in the flow 102, the air/mass ratio of the flow 102, gas volume fraction of the flow 102, the speed of sound propagating through the flow 102, and/or the percentage of entrained air within the flow 102.

Similar to the array processor 130 of FIG. 2, the array processor 152 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array 106 into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

One such technique of determining the speed of sound propagating through the process flow 102 is using array processing techniques to define an acoustic ridge 760, 762 in the k-ω plane as shown in FIG. 15. The slope of the acoustic ridge 760, 762 is indicative of the speed of sound propagating through the process flow 102. The speed of sound (SOS) is determined by applying sonar arraying processing techniques to determine the speed at which the one dimensional acoustic waves propagate past the axial array of unsteady pressure measurements distributed along the pipe 104.

The flow logic 116 of the present embodiment measures the speed of sound (SOS) of one-dimensional sound waves propagating through the process flow 102 to determine the gas volume fraction of the process flow 102. It is known that sound propagates through various mediums at various speeds in such fields as SONAR and RADAR fields. The speed of sound propagating through the pipe 104 and process flow 102 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. pat. application Ser. No. 09/997,221, filed Nov. 28, 2001, now US 6,587,798; U.S. pat. application Ser. No. 10/007,749, filed Nov. 7, 2001, and U.S. patent application Ser. No. 10/762,410, filed Jan. 21, 2004, each of which are incorporated herein by reference.

The analyzer 158 of the flow logic 116 provides output parameters 160 indicative of characteristics of the process flow 102 that are related to the measured speed of sound (SOS) propagating through the process flow 102. For example, to determine the gas volume fraction (or phase fraction), the analyzer 158 assumes a nearly isothermal condition for the process flow 102. As such the gas volume fraction or the void fraction is related to the speed of sound by the following quadratic equation:

$$Ax^2 + Bx + C = 0$$

wherein x is the speed of sound, $A=1+rg/rl*(K_{eff}/P-1)-K_{eff}/P$, $B=K_{eff}/P-2+rg/rl$; $C=1-K_{eff}/rl*a_{meas}^2$); R = gas density, rl = liquid density, $K_{eff}$ = effective K (modulus of the liquid and pipewall), P = pressure, and $a_{meas}$ = measured speed of sound.

Effectively, $$Gas\ Volume\ Fraction\ (GVF) = (-B + sqrt(B^2 - 4*A*C))/(2*A)$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix} a_{mix\infty}^2} = \sum_{i=1}^{N} \frac{\phi_i}{\rho_i a_i^2} \text{ where } \rho_{mix} = \sum_{i=1}^{N} \rho_i \phi_i$$

One dimensional compression waves propagating within a process flow 102 contained within a pipe 104 exert an unsteady internal pressure loading on the pipe 104. The degree to which the pipe 104 displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity (aeff) for one dimensional compression is given by the following expression:

$$a_{eff} = \frac{1}{\sqrt{1/a_{mix\infty}^2 + \rho_{mix}\frac{2R}{Et}}} \quad (eq\ 1)$$

Figure 18:
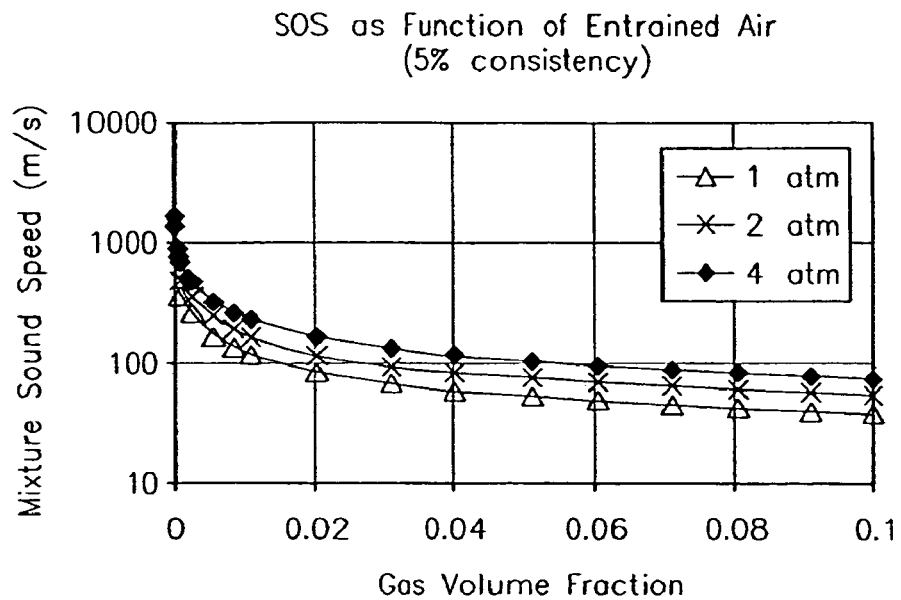
FIG. 18 is a plot of mixture sound speed as a function of gas volume fraction for a 5% consistency slurry over a range of process pressures.

The mixing rule essentially states that the compressibility of a process flow ($1/(\rho a^2)$) is the volumetrically-weighted average of the compressibilities of the components. For a process flow 102 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 18.

As described hereinbefore, the flow logic 116 of the present embodiment includes the ability to accurately determine the average particle size of a particle/air or droplet/air mixture within the pipe 104 and the air to particle ratio. Provided there is no appreciable slip between the air and the solid coal particle, the propagation of one dimensional sound wave through multiphase mixtures is influenced by the effective mass and the effective compressibility of the mixture 102. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasingly less valid. For a given average particle size, the increase in slip with frequency causes dispersion, or, in other words, the sound speed of the mixture 102 changes with frequency. With appropriate calibration the dispersive characteristic of a process flow 102 will provide a measurement of the average particle size, as well as, the air to particle ratio (particle/fluid ratio) of the process flow 102.

In accordance with the present invention the dispersive nature of the system 100 utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R.L. Gibson, Jr. and M.N. Toksdz) published Jan. 5, 1989, which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\frac{1}{1 + \frac{\varphi_p \rho_p}{\rho_f\left(1 + \omega^2 \frac{\rho_p^2 v_p^2}{K^2}\right)}}}$$

In the above relation, the fluid SOS, density ($\rho$) and viscosity ($\Phi$) are those of the pure phase fluid, $v_p$ is the volume of individual particles and $\rho_p$ is the volumetric phase fraction of the particles in the mixture.

Figure 19:
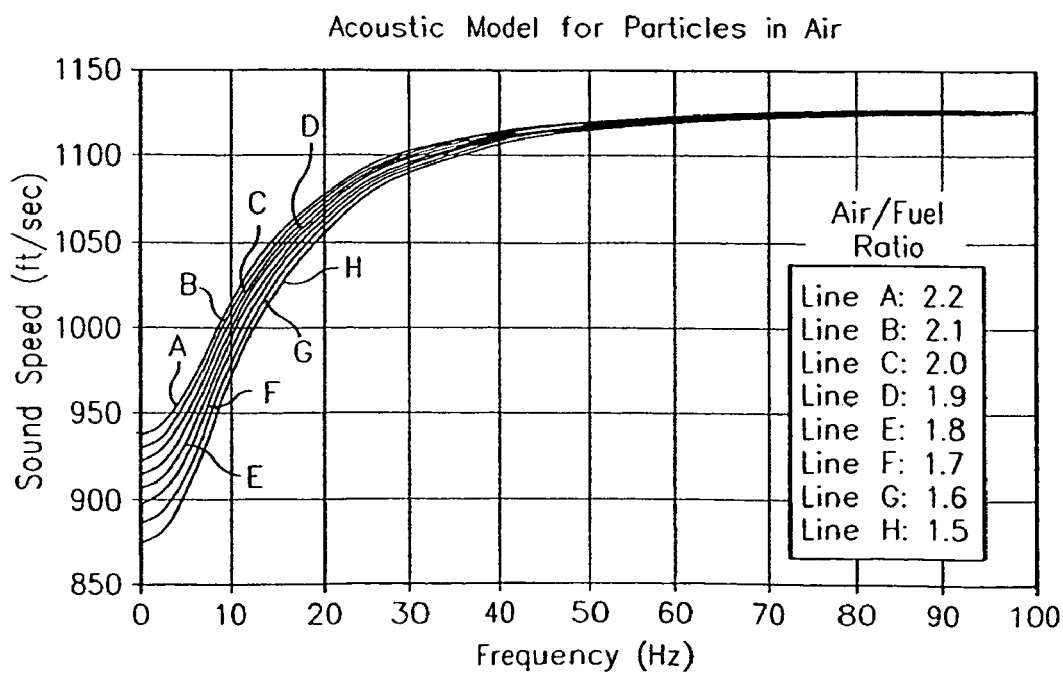
FIG. 19 is a plot of sound speed as a function of frequency for air/particle mixtures with fixed particle size and varying air-to-particle mass ratio.
Figure 20:
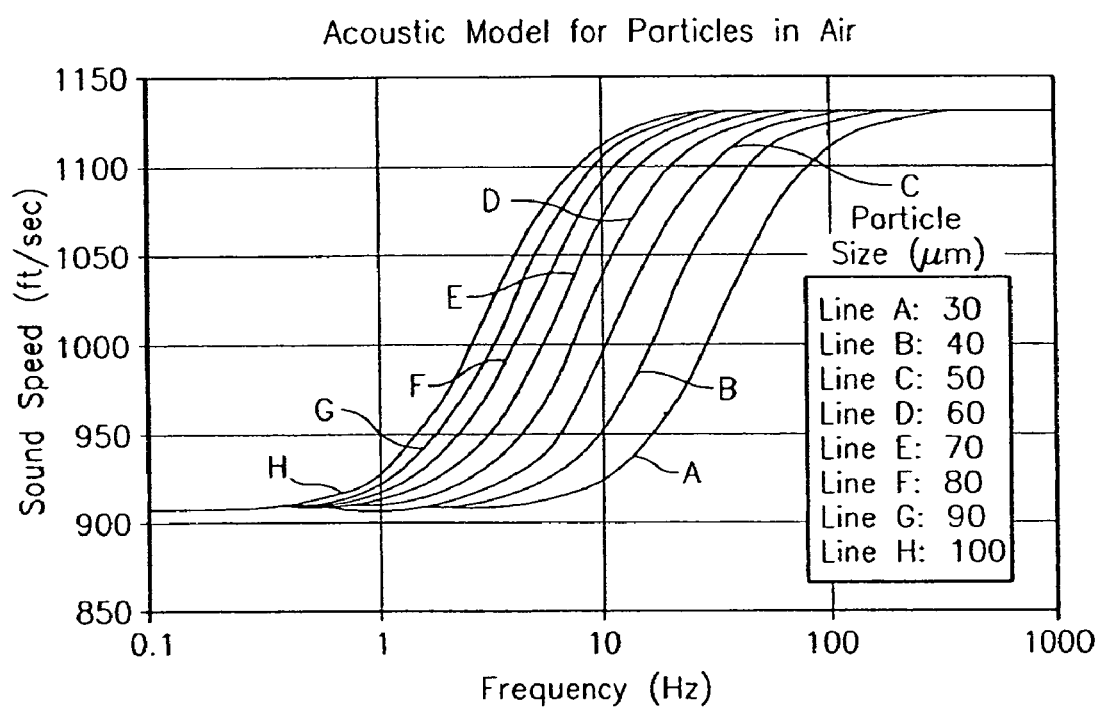
FIG. 20 is a plot of sound speed as a function of frequency for air/particle mixtures with fixed aft-to-particle mass ratio and fixed particle size.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 19 and FIG. 20 show the dispersive behavior in relation to the speed of sound for coal/air mixtures with parameters typical of those used in pulverized coal deliver systems.

In particular FIG. 19 shows the predicted behavior for nominally 50 micrometer size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 20 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIG. 19 and FIG. 20 illustrate that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 micrometer size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 116 may be implemented in software (using a microprocessor or computer) and/or firmware, or may be implemented using analog and/or digital hardware, having sufficient memory, interfaces, and capacity to perform the functions described herein.

While FIG. 2 and FIG. 14 depict two different embodiments of the flow logic 116 to measure various parameters of the flow process, the present invention contemplates that the functions of these two embodiments may be performed by a single flow logic 116.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. A method of processing flow meter sensing data to filter out signal noise, the method comprising:

obtaining said flow meter sensing data;

defining the flow meter sensing data in a k-ω plane, wherein the k-ω plane includes a first k-plane quadrant separated from a second k-plane quadrant by a k axis, wherein the flow meter sensing data includes a first data set disposed within said first k-plane quadrant and a second data set disposed within said second k-plane quadrant;

subtracting said first data set from said second data set symmetrical to said k axis to obtain a resultant data set to filter out the signal noise; and providing an output corresponding to said resultant data set.

2. The method of claim 1, further comprising, receiving analog flow meter sensing data from at least one sensing device;

processing said analog flow meter sensing data to generate flow meter data defined in the time domain; and converting said flow meter data defined in the time domain into said flow meter sensing data defined in the k-ω plane.

3. The method of claim 1, wherein said flow meter sensing data includes sensor data at at least two locations disposed axially along a pipe having fluid flowing therethrough, and wherein the respective sensor data is indicative to at least one characteristic of the fluid at each respective location.

4. The method of claim 1, wherein said subtracting includes, inverting at least one of said first data set and said second data set in the k-plane, and subtracting overlapping elements of at least one of said first data set and said second data set from the other of said at least one of said first data set and said second data set.

5. The method of claim 1, wherein said resultant data set includes at least one of a positively sloped convective ridge line and a negatively sloped convective ridge line.

6. The method of claim 5, wherein if said positively sloped convective ridge line intersects with said negatively sloped convective ridge line, the method further comprises:

selecting a plurality of data points along each of said positively sloped convective ridge line and said negatively sloped convective ridge line, and extrapolating said plurality of data points for at least one of said positively sloped convective ridge line and said negatively sloped convective ridge line to obtain a slope value for at least one of said positively sloped convective ridge line and said negatively sloped convective ridge line.

7. The method of claim 5, further includes determining the slope of a portion of at least one of said positively sloped convective ridge line and said negatively sloped convective ridge line, which is indicative of the velocity of fluid in a pipe.

8. The method of claim 7, wherein at least one of said positively sloped convective ridge line and said negatively sloped convective ridge line is indicative of unsteady pressures propagating with the fluid flowing in the pipe.

9. The method of claim 1, wherein said first data set is responsive to a sound wave traveling in said first k-plane quadrant away from said second k-plane quadrant at a first rate and wherein said second data set is responsive to a sound wave traveling in said second k-plane quadrant away from said first k-plane quadrant at a second rate.

10. The method of claim 9, wherein if said first rate is different from said second rate, said subtracting includes,
   inverting at least one of said first data set and said second data set in the k-plane, and
   subtracting overlapping elements of at least one of said first data set and said second data set from the other of said at least one of said first data set and said second data set.

11. The method of claim 1, wherein at least one of said first data set and said second data set is responsive to a sound wave traveling axially in a fluid in a pipe in one direction or both directions.

12. The method of claim 1, wherein said k axis is disposed at k=0 or one of k=N2π, wherein said N is an integer.

13. An apparatus for measuring a parameter of a fluid flowing within a pipe, wherein the apparatus includes logic for implementing a method of processing flow meter data to filter out signal noise, the apparatus comprising:
   a sensing device having at least two sensors for sensing a characteristic of the fluid flow and generating flow meter sensing data responsive to said characteristic; said at least two sensors being disposed axially along the pipe; and
   a processing device, in response to the flow meter sensing data, filtering out signal noise by defining the flow meter sensing data in a k-ω plane, wherein the k-ω plane includes a first k-plane quadrant separated from a second k-plane quadrant by a k axis, wherein the flow meter sensing data includes a first data set disposed within said first k-plane quadrant and a second data set disposed within said second k-plane quadrant, and subtracting said first data set from said second data set symmetrical to said k axis to obtain a resultant data set to filter out the signal noise; and
   providing an output corresponding to said resultant data set.

14. The apparatus of claim 13, wherein the logic further includes instructions for,
   receiving analog flow meter sensing data from said sensing device;
   processing said analog flow meter sensing data to generate flow meter data defined in the time plane; and
   converting said flow meter data defined in the time domain into said flow meter sensing data defined in the k-ω plane.

15. The apparatus of claim 13, wherein said sensing device includes at least two sensors disposed in at least two locations along the axial length of the pipe and wherein the flow meter sensing data is responsive to at least one fluid characteristic of said at least two sensors.

16. The apparatus of claim 13, wherein the logic further includes instruction for,
   inverting at least one of a first data set and a second data set in the k-plane, and
   subtracting overlapping elements of at least one of said first data set and said second data set from the other of said at least one of said first data set and said second data set.

17. The apparatus of claim 13, wherein said first data set is responsive to a sound wave traveling in said first k-plane quadrant away from said second -k-plane quadrant at a first rate and wherein said second data set is responsive to a sound wave traveling in said second k-plane quadrant away from said first k-plane quadrant at a second rate.

18. The apparatus of claim 17, wherein if said first rate is different from said second rate, said subtracting includes,
   inverting at least one of said first data set and said second data set in the k-plane, and
   subtracting overlapping elements of at least one of said first data set and said second data set from the other of said at least one of said first data set and said second data set.

19. The apparatus of claim 17, wherein at least one of said first data set and said second data set is responsive to a sound wave traveling in one direction along the k-plane.

20. For a flow meter having at least one sensing device for measuring a parameter of a fluid flowing within a pipe, a machine-readable computer program code encoded in a computer-readable storage medium, the program code including instructions for causing a controller to implement a method of processing flow meter data to filter out signal noise, the method comprising:
   obtaining said flow meter sensing data;
   defining flow meter sensing data in a k-ω plane, wherein the k-ω plane includes a first k-plane quadrant separated from a second k-plane quadrant by a k axis, wherein the flow meter sensing data includes a first data set disposed within said first k-plane quadrant and a second data set disposed within said second k-plane quadrant;
   subtracting said first data set from said second data set symmetrical to said k axis to filter out the signal noise and to obtain a resultant data set; and
   providing an output corresponding to said resultant data set.

* * * * *